United States Patent
Kim et al.

(10) Patent No.: US 7,619,187 B2
(45) Date of Patent: Nov. 17, 2009

(54) POROUS CERAMIC HEATING ELEMENT AND METHOD OF MANUFACTURING THEREOF

(76) Inventors: Changhee Kim, Jugon apartment 404-1001 184-3 Jeongwang-dong, Siheung City, Gyeonggi-province 429-450 (KR); Taehee Kim, 146-4 Sarim-dong, Changwon-City, Gyeongsangnam-province 641-240 (KR)

( * ) Notice: Subject to any disclaimer, the term of this patent is extended or adjusted under 35 U.S.C. 154(b) by 844 days.

(21) Appl. No.: 10/523,212

(22) PCT Filed: Sep. 24, 2004

(86) PCT No.: PCT/KR2004/002502

§ 371 (c)(1),
(2), (4) Date: Jan. 27, 2005

(87) PCT Pub. No.: WO2006/016730

PCT Pub. Date: Feb. 16, 2006

(65) Prior Publication Data

US 2007/0003750 A1    Jan. 4, 2007

(30) Foreign Application Priority Data

Aug. 7, 2004    (KR)    ............... 10-2004-0062267

(51) Int. Cl.
*H05B 3/10*    (2006.01)
*B32B 3/00*    (2006.01)

(52) U.S. Cl. .............. 219/553; 219/552; 219/205; 219/270; 219/541; 219/544; 428/312.2; 428/701; 428/688; 428/209; 428/446; 338/283; 338/284; 338/285; 338/294; 373/117; 373/111; 29/610.1; 29/620

(58) Field of Classification Search ............. 219/552–3, 219/205, 270, 541, 544; 428/312.2, 701, 428/688, 209, 446, 408; 338/283–5, 294; 252/516, 518; 373/111, 117; 29/610.1, 620
See application file for complete search history.

(56) References Cited

U.S. PATENT DOCUMENTS 3,804,648 A * 4/1974 Birchall et al. ............... 501/100

FOREIGN PATENT DOCUMENTS

| EP | 95720 A | 12/1983 |
|---|---|---|
| JP | 3-62489 A | 3/1991 |
| JP | 2004-22285 A | 1/2004 |

* cited by examiner

*Primary Examiner*—Shawntina Fuqua
(74) *Attorney, Agent, or Firm*—Sughrue Mion, PLLC

(57) ABSTRACT

Disclosed herein is a porous ceramic heating element wherein 0.08 to 1.00 wt % of a foaming agent is added in 99.00 to 99.92 wt % of a mixture of an inorganic material, a binder, a conductive material, a hardener, a bonding agent and a dispersion medium and mixed with the mixture. The bonding strength of porous foam formed in the ceramic heating element is increased, thereby providing an effect that the entire structure is hardened.

8 Claims, 3 Drawing Sheets

POROUS CERAMIC HEATING ELEMENT AND METHOD OF MANUFACTURING THEREOF

TECHNICAL FIELD

The present invention relates to a porous ceramic heating element and a method of manufacturing thereof, and more particularly, to a porous ceramic heating element recycling steel slag and blast-furnace slag discharged from an iron works as an inorganic material and adding methyl hydrogen polysiloxane as a foaming agent for providing porosity and a method of manufacturing the porous ceramic heating element using said materials in a low temperature.

BACKGROUND ART

In general, a porous ceramic artificially form a large number of pores inside a ceramic and are used as lightweight construction materials within the specified extent because of its low specific gravity and lightness in weight. Moreover, the porous ceramic is variously used as various kinds of filters, instrumental materials for firing, deodorizers, heat insulating materials, soundproofing materials and heating materials.

In this porous ceramic heating element and method of manufacturing thereof, the following porous ceramic heating element and method of manufacturing thereof are generally used according to the related art.

First, the related art porous ceramic heating element is the mixture of aluminosilicate hydrogel, ceramic powder such as a carbide, a nitride and an oxide, 0.1 to 0.2% of aluminum particles, 0.4 to 0.8% of silicon glycol as a surface active agent, and 1 to 4% of silica as a gel strengthening agent.

In the method of manufacturing this porous ceramic heating element, after metal in the form of powder reacts to alkali solution, the mixture is put in aluminate slurry and molded in desired shape.

In that case, the molded product becomes the porous ceramic heating element while hydrogen is generated from the molded product. After that, the porous ceramic heating element is washed to remove the alkali and sintered, thereby obtaining the desired porous ceramic heating element.

However, the related art porous ceramic heating element have disadvantages that the bonding strength of pores formed inside is so weak that the mechanical strength of the structure of the porous ceramic heating element generally becomes weak, and the ability of storing heat is decreased.

Further, in the methods of manufacturing the related art porous ceramic heating element, an organic material is mixed with ceramic slurry, and then firing process is followed, thereby obtaining porosity.

However, if the porous ceramic heating element is heated in a high temperature, such porous ceramic heating element generates a poisonous gas carbonizing an added organic foaming agent.

In addition, the porous ceramic heating element has disadvantages of shape restriction and economic difficulty due to a high sintering temperature of over 1100° C. and a process complexity.

DISCLOSURE OF INVENTION

Technical Problem

To solve the above and/or other problems, the present invention provides a porous ceramic heating element in which the bonding strength of pores formed in the ceramic heating element are increased, thereby generally enhancing mechanical strength and thermal storage characteristics.

Also, the present invention provides a method of manufacturing a porous ceramic heating element manufacturing the same porous ceramic heating element in a low temperature.

Technical Solution

According to an aspect of the present invention, the present invention provides a porous ceramic heating element wherein 0.08 to 1.00 wt % of a foaming agent is added in 99.00 to 99.92 wt % of a mixture of an inorganic material, a binder, a conductive material, a hardener, a bonding agent and a dispersion medium and mixed with the mixture.

Herein, the inorganic material includes at least one composition selected among steel slag, blast-furnace slag, alumina, mullite, silicon carbide, titanium carbide, silicon nitride, aluminum nitride, feldspar, zeolite, kaolin, sericite, talc, mica, illite, pearlite, vermiculite, sepiolite and diatomaceous earth and forms 40 to 66 wt % of the mixture.

The binder is zirconium silicate and forms 2 to 6 wt % of the mixture.

The conductive material is graphite and forms 8 to 12 wt % of the mixture.

The hardener is any one of zinc borate, manganese borate and magnesium borate and forms 3 to 33 wt % of the mixture.

The bonding agent is alkali metal silicate and forms 16 to 37 wt % of the mixture.

The dispersion medium is water and forms 1 to 8 wt % of the mixture.

The foaming agent is methyl hydrogen polysiloxane.

The bonding agent and the hardener make a condensation polymerization reaction.

In addition, a method of manufacturing a porous ceramic heating element, the method comprises first mixing an inorganic material, a binder providing caking property to the inorganic material, a foaming agent forming foam and a hardener increasing solidity; adding a bonding agent having the mixture mutually bonded and a dispersion medium providing fluidity to the bonding agent, and second mixing them; loading the mixture by second mixing into a mold; setting the mixture loaded into the mold in room temperature and forming pores in the mixture; first drying the mixture in which the pores are formed; demolding the first dried mixture from the mold; and second drying the first dried mixture demolded from the mold.

Herein, the temperature for first drying is in the range of 30 to 120° C.

The temperature for second drying is in the range of 80 to 350° C.

Advantageous Effects

As described above, the porous ceramic heating element and the method of manufacturing thereof according to the present invention has the following effects.

First, steel slag and blast-furnace slag discharged from an iron works are used as an inorganic material, thereby obtaining advantages of recycling resources and environmental affinity.

Second, bonding strength of porous foam formed in a ceramic heating element becomes strong, thereby providing a porous ceramic heating element in which the entire structure is hardened.

Third, methyl hydrogen polysiloxane is used as a foaming agent, thereby accelerating the formation of foam and preventing the discharge of harmful gas during firing process in a low temperature.

BEST MODE FOR EMBODYING THE INVENTION

Figure 1:
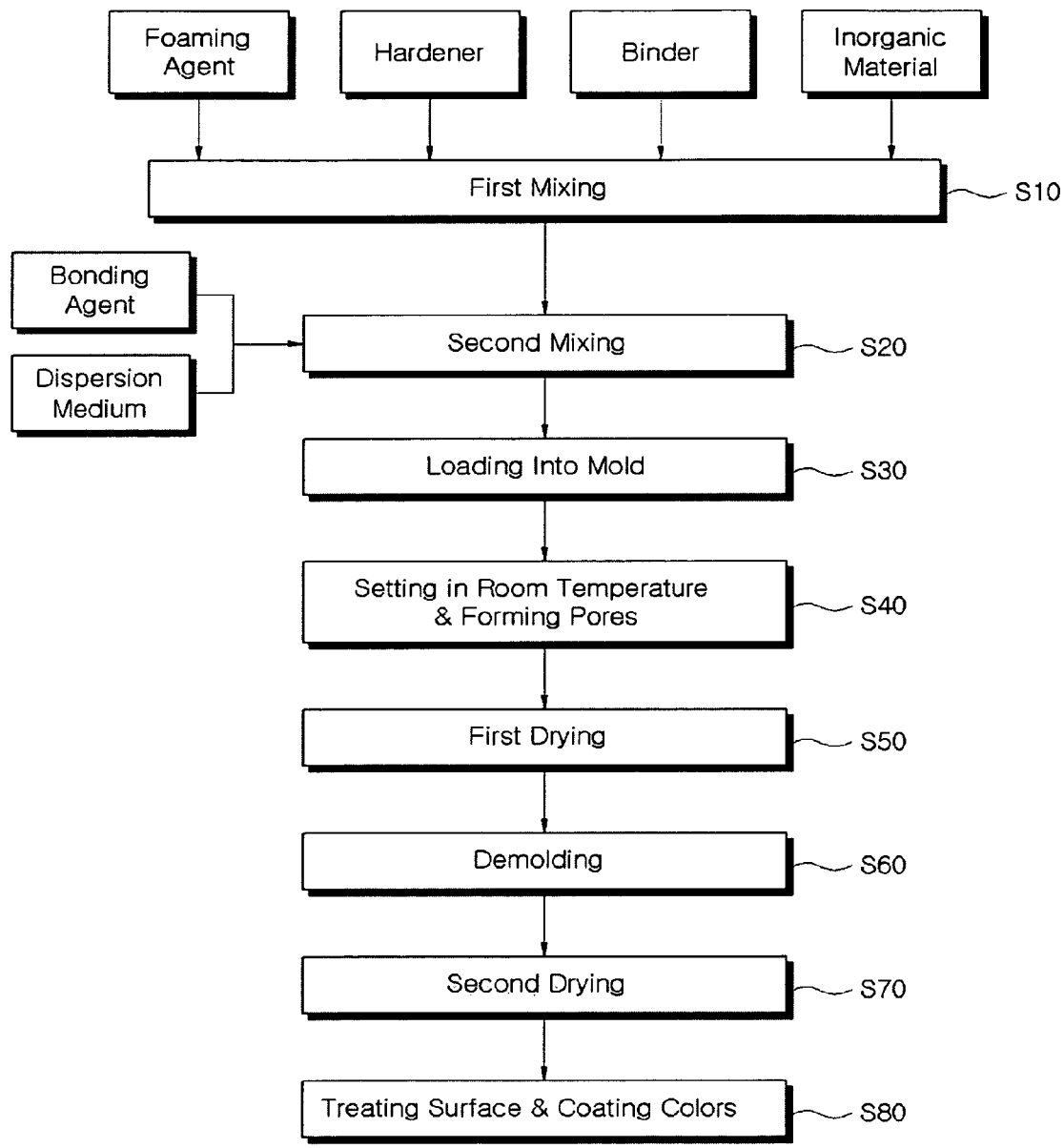
FIG. 1 is a flow chart sequentially showing the method of manufacturing a porous ceramic heating element according to an embodiment of the present invention.

The present invention provides a porous ceramic heating element wherein 0.08 to 1.00 wt % of a foaming agent is added in 99.00 to 99.92 wt % of a mixture of an inorganic material, a binder, a conductive material, a hardener, a bonding agent and a dispersion medium and mixed with the mixture.

Herein, the bonding agent and the hardener have a tetrahedron structure by a condensation polymerization reaction, and the tetrahedron structure forms silica gel by cross-linking with metal or fixing of metal.

Assuming that the mixture is 100wt %, the inorganic material is a nonflammable material forming 40 to 66 wt % of the mixture and a packing material for the frame of a final molded product. Herein, the inorganic material may be selected one composition or mixture by mixing at least two selected compositions among industrial by-products such as steel slag and blast-furnace slag, metal oxide systems such as alumina ($Al_2O_3$) and mullite ($3Al_2O_3 \cdot 2SiO_2$), metal carbide systems such as silicon carbide (SiC), titanium carbide (TiC), metal nitride systems such as silicon nitride ($Si_3N_4$) and alumina nitride (AlN), alkaline earth metal systems such as feldspar, zeolite, kaolin, sericite, talc and mica, and lightweight materials such as illite, pearlite, vermiculite, sepiolite and diatomaceous earth.

Particularly, the steel slag and the blast-furnace slag used in the present invention are comprised of compositions shown in TAB. 1. This TAB. 1 is provided by Kwangyang Iron Works of POSCO. Among the compositions shown in TAB. 1, calcium oxide (CaO) has latent hydraulic property, in which the calcium oxide is hardened if it reacts with alkali, and $SiO_2$, $Al_2O_3$ and MnO have a property of irradiating a far infrared ray. Therefore, it is preferred that the above compositions are used as materials for forming the frame of a final molded product.

TABLE 1

| Compositions | Steel Slag (wt %) | Blast-furnace Slag (wt %) |
| --- | --- | --- |
| FeO | 16.4~22.6 | 0.02~0.64 |
| $Fe_2O_3$ | 13.2 | — |
| $SiO_2$ | 10.5~14.8 | 30.7~33.9 |
| CaO | 38.5~46.1 | 40.5~43.9 |
| $Al_2O_3$ | 0~1.5 | 12.6~15.2 |
| MgO | 2.3~6.3 | 4.2~9.2 |
| MnO | 5.4~6.5 | 0.19~0.5 |
| $P_2O_5$ | 1.7~2.2 | 0.00~0.016 |
| S | 0~0.08 | 0.41~1.02 |

TABLE 1-continued

| Compositions | Steel Slag (wt %) | Blast-furnace Slag (wt %) |
| --- | --- | --- |
| $TiO_2$ | 0~1.5 | 0.42~1.73 |
| PH | 11~12 | 10~12 |

In addition, the steel slag and the blast-furnace slag are discharged diversely in granularity, and it is preferred that the granularity of the steel slag and the blast-furnace slag is less than 0.2 mm. If the granularity exceeds 0.2 mm, an air gap between one article and another is formed so large that a cross section for bonding foam described later is small, thereby weakening to some degree in response to external pressure. Furthermore, foaming ability is decreased due to particle specific gravity.

Assuming that the mixture is 100 wt %, the binder is zirconium silicate forming 2 to 6 wt % of the mixture and used for providing caking property among particles. The zirconium silicate is mixed with alkali metal silicate, thereby preventing foam from growing fast in over 100° C. of drying temperature, and increasing mechanical, thermal strength and chemical resistance. In addition, it is preferred that the average granularity of zirconium silicate is less than 1 μm for its good caking property.

Assuming that the mixture is 100 wt %, the conductive material is graphite forming 8 to 12 wt % of the mixture. Since if the input of the graphite is increased, the resistance value is decreased and the flow of electric current is satisfactory in a low voltage. However, because of the low coefficient of friction, the excessive input of the graphite may weaken its bonding strength, thereby decreasing mechanical strength. Thus, the graphite forming 8 to 12 wt % of the mixture is preferred.

Assuming that the mixture is 100 wt %, the hardener is any one of zinc borate, manganese borate and magnesium borate forming 3 to 33 wt % of the mixture. In this regard, the hardener is used for hardening reaction of alkali metal silicate. It is preferred that the average granularity of the hardener is 0.01 to 0.02 mm.

Assuming that the mixture is 100 wt %, the bonding agent is alkali silicate forming 16 to 37 wt % of the mixture. In this case, the alkali silicate is used for bonding inorganic materials, and Na-silicate ($Na_2O \cdot nSiO_2[n=2.2~3.4] \cdot H_2O$), Li-silicate ($Li_2O \cdot nSiO_2[n=2.5~8.5] \cdot H_2O$) and K-silicate ($K_2O \cdot nSiO_2[n=1.5~5.1] \cdot H_2O$) may be used separately or in combination. Herein, n is mole ratio. The Na-silicate having more than 1.38(25° C.) of specific gravity and 3.0 to 3.4 of mole ratio is generally used in industrial fields, and its price is cheap.

Assuming that the mixture is 100 wt %, the dispersion medium is water forming 1 to 8 wt % of the mixture.

The foaming agent is methyl hydrogen polysiloxane as a kind of reactive silicon oil and used for the raw oil of a textile water repellent agent, water repellent treatment for the powder of a fire extinguisher and the powder of cosmetics or treating the surface of metal, glass, ceramics and carbon resistors. Also, the foaming agent has a characteristic in which viscosity is gradually increased generating hydrogen by heat, a very small amount of acid or alkali metal, thereby becoming gelation. Accordingly, if the foaming agent is added to the mixture, the mixture grows slowly forming foam in room temperature by the generation of hydrogen, thereby increasing 5 to 60% volume of the entire molded product. Since methyl group having hydrophobic property forces out water in the methyl hydrogen polysiloxane during heating process, the final molded product possesses repellency.

The method of manufacturing a porous ceramic heating element containing the compositions described above is shown in FIG. 1.

Referring to FIG. 1, an inorganic material, a binder, a foaming agent and a hardener are first mixed, which they have the above composition ratio (S10). A bonding agent is added so that the mixture is mutually bonded, and a dispersion medium is added so that it provides fluidity to the bonding agent, and then they are second mixed (S20). Also, the mixture is loaded into the mold and set in room temperature so that pores are formed in the mixture (S30, S40). After the pores grow in the mixture as described above, the mixture is first dried in temperature of the range of 30 to 120° C. (S50). Moreover, the first dried mixture is demolded from the mold (S60) and second dried in temperature of the range of 80 to 350° C. (S70). The pores formed in the mixture possess a frame through the first and second drying process. Then, the molded mixture follows treating surface to the desired direction or coating the desired colors (S80).

Among the items of the following EMBODIMENT, the test for compressive strength was performed according to the regulations on the test for compressive strength of hollow concrete blocks, KSF 4004.

[EMBODIMENT]

|  | Embodiments | | | | | |
|---|---|---|---|---|---|---|
|  | A | B | C | D | E | F |
| COMPOSITIONS | | | | | | |
| Blast-furnace Slag (wt %) | 58 | 58 | 58 | 57 | 55 | 54 |
| Zirconium Silicate (wt %) | 2 | 2 | 2 | 2 | 2 | 2 |
| Graphite (wt %) | 8 | 8 | 8 | 8 | 8 | 8 |
| Zinc Borate (wt %) | 6 | 6 | 6 | 6 | 6 | 6 |
| Na-Silicate (wt %) | 23 | 23 | 23 | 24 | 24 | 24 |
| Water (wt %) | 3 | 3 | 3 | 1 | 5 | 8 |
| Total Summation (wt %) | 100 | 100 | 100 | 100 | 100 | 100 |
| Foaming agent (wt %) | 0.2 | 0.6 | 1.0 | 0.2 | 0.2 | 0.2 |
| Average Porosity (%) | 48 | 60 | 72 | 43 | 36 | 25 |
| Compressive Strength (kg/cm$^2$) | 155 | 136 | 65 | 160 | 136 | 75 |
| pH | 9.3 | 9.1 | 9.4 | 9.2 | 9.2 | 9.5 |
| Area Electric Resistance ($\Omega$) | 60 | 650 | 850 | 70 | 165 | 340 |

In the embodiments A, B and C among said embodiments, the only composition of methyl hydrogen polysiloxane as a foaming agent is varied.

Referring to the items of the embodiments A, B and C, excessive foam is generated if the amount of a foaming agent added is increased. In other words, the average porosity is increased, thereby decreasing the compressive strength. Since the boundary surfaces among pores are not dense by the unique water repelling ability of the foaming agent, the value of area resistance is rapidly increased. If a porous ceramic heating element whose value of area resistance is high is used as a heating element, the ceramic heating element needs high voltage of more than 120V. Thus, it is preferred that the foaming agent is less than 1.00 wt %.

In the embodiments D, E and F among said embodiments, the only composition of water as a dispersion medium is varied.

Referring to the items of the embodiments D, E and F, compressive strength is decreased if the amount of water added is increased. This is attributed to the increase of fluidity by water added. Therefore, assuming that the mixture is 100 wt %, it is preferred that the water added as a dispersion medium is less than 8 wt % of the mixture.

Figure 2:
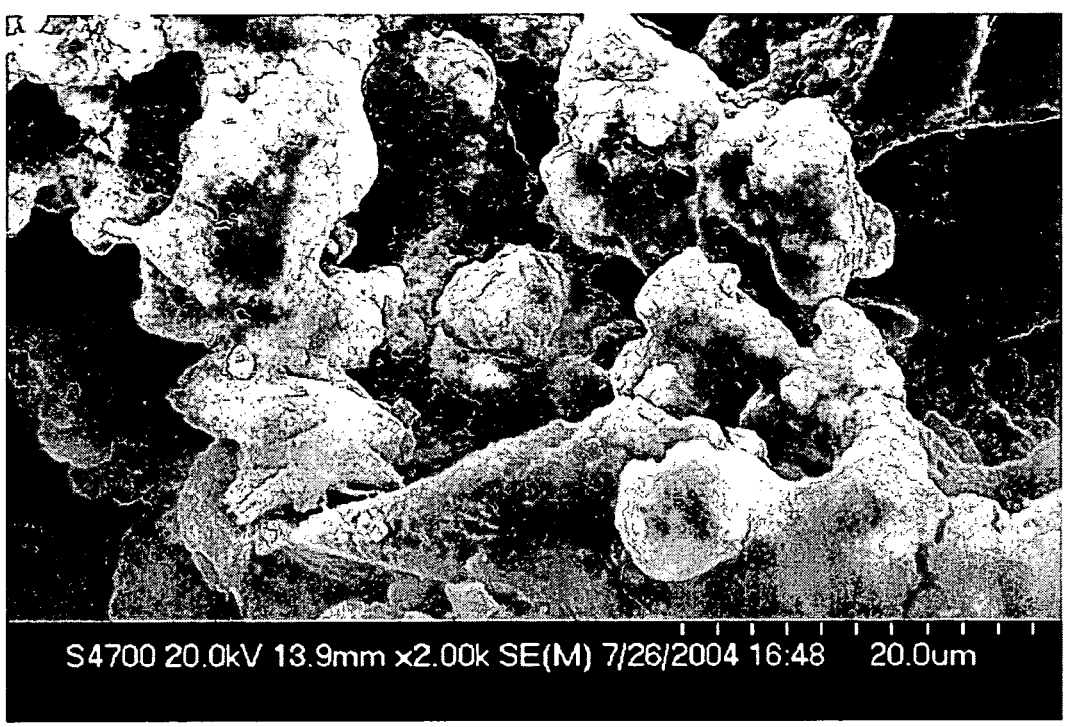
FIG. 2 is a picture of a scanning electron microscope showing the porous ceramic heating element manufactured according to the FIG. 1, magnified 2,000 times.
Figure 3:
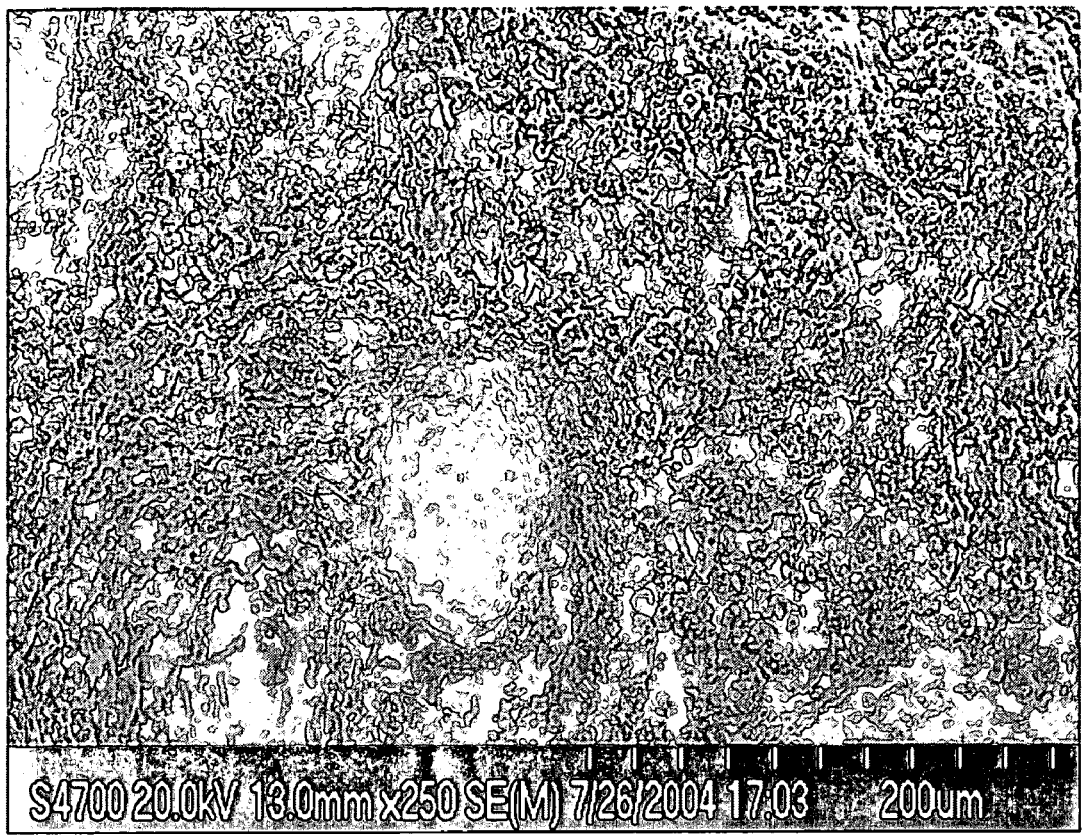
FIG. 3 is a picture of a scanning electron microscope showing the porous ceramic heating element manufactured according to the FIG. 1, magnified 250 times.

FIG. 2 and FIG. 3 are pictures of a scanning electron microscope for the embodiment A.

Referring to the pictures, the porous ceramic heating element having the composition rate of the embodiment A possesses pores connected each other, and the average size of the pores is 20 μm, which is uniform. Also, the average porosity shows 48%, which the value of the average porosity is calculated by a formula, that is, 1-(density of porous ceramic heating element /density of raw particle).

Such porous ceramic heating element manufactured with said compositions in accordance with said method of manufacturing may prevent poisonous gas generated by an organic foaming agent in high heating temperature according to the related art. Moreover, sintering temperature is lowered, and processes are simplified, thereby economically manufacturing various shapes of porous ceramic heating elements.

While this invention has been particularly shown and described with reference to preferred embodiments thereof, it will be understood by those skilled in the art that various changes and modifications in form and details may be made therein without departing from the spirit and scope of the invention as defined by the appended claims.

INDUSTRIAL APPLICABILITY

As described above, the porous ceramic heating element and the method of manufacturing thereof according to the present invention can be used in the field of manufacturing lightweight construction materials such as heating materials, heat insulating materials and soundproofing materials.

What is claimed is:

1. A porous ceramic heating element wherein 0.08 to 1.00 wt % of a foaming agent is added in 99.00 to 99.92 wt % of a mixture of an inorganic material, a binder, a conductive material, a hardener, a bonding agent and a dispersion medium and mixed with the mixture,
wherein the foaming agent is methyl hydrogen polysiloxane 2. The porous ceramic heating element of claim 1 wherein the inorganic material includes at least one composition selected among steel slag, blast-furnace slag, alumina, mullite, silicon carbide, titanium carbide, silicon nitride, aluminum nitride, feldspar, zeolite, kaolin, sericite, talc, mica, illite, pearlite, vermiculite, sepiolite and diatomaceous earth and forms 40 to 66 wt % of the mixture.

3. The porous ceramic heating element of claim 1 wherein the binder is zirconium silicate and forms 2 to 6 wt % of the mixture.

4. The porous ceramic heating element of claim 1 wherein the conductive material is graphite and forms 8 to 12 wt % of the mixture.

5. The porous ceramic heating element of claim 1 wherein the hardener is any one of zinc borate, manganese borate and magnesium borate and forms 3 to 33 wt % of the mixture.

6. The porous ceramic heating element of claim 1, wherein the bonding agent is alkali metal silicate and forms 16 to 37 wt % of the mixture.

7. The porous ceramic heating element of claim 1, wherein the dispersion medium is water and forms 1 to 8 wt % of the mixture.

8. The porous ceramic heating element of claim 1, wherein the bonding agent and the hardener make a condensation polymerization reaction.

* * * * *